(12) United States Patent
Arienti et al.

(10) Patent No.: US 11,597,146 B2
(45) Date of Patent: Mar. 7, 2023

(54) METHOD AND APPARATUS FOR SURFACE FINISHING OF ARTICLES PRODUCED BY 3D PRINTING

(71) Applicant: 3DNEXTECH S.R.L., Capannoli (IT)

(72) Inventors: Andrea Arienti, Leghorn (IT); Maurizio Follador, Givoletto (IT)

(73) Assignee: 3DNEXTECH S.R.L., Cappannoli (IT)

( * ) Notice: Subject to any disclaimer, the term of this patent is extended or adjusted under 35 U.S.C. 154(b) by 249 days.

(21) Appl. No.: 16/624,623

(22) PCT Filed: Jun. 23, 2018

(86) PCT No.: PCT/IT2018/050113
§ 371 (c)(1),
(2) Date: Dec. 19, 2019

(87) PCT Pub. No.: WO2018/235121
PCT Pub. Date: Dec. 27, 2018

(65) Prior Publication Data
US 2020/0215757 A1    Jul. 9, 2020

(30) Foreign Application Priority Data

Jun. 23, 2017 (IT) .................. 102017000070567
Nov. 23, 2017 (IT) .................. 102017000134861

(51) Int. Cl.
*B29C 64/188* (2017.01)
*B33Y 40/20* (2020.01)

(52) U.S. Cl.
CPC ............ *B29C 64/188* (2017.08); *B33Y 40/20* (2020.01)

(58) Field of Classification Search
CPC ... B29C 64/188; B29C 64/35; B29C 71/0009; B29C 64/364; B29C 64/295
See application file for complete search history.

(56) References Cited

U.S. PATENT DOCUMENTS 5,004,486 A * 4/1991 Chen ..................... F23J 15/06
                                                      96/240
5,448,838 A    9/1995 Edmonds
(Continued)

FOREIGN PATENT DOCUMENTS

RU    2625848 C1 *  7/2017 ............. B29C 64/20
WO   03/089218 A1   10/2003
(Continued)

OTHER PUBLICATIONS

International Search Report and Written Opinion of the International Searching Authority for International Patent Application No. PCT/IT2018/050113 dated Oct. 11, 2018, 11 pages.
(Continued)

*Primary Examiner* — Jacob T Minskey
*Assistant Examiner* — Caroline Beha
(74) *Attorney, Agent, or Firm* — Merchant & Gould P.C.

(57) ABSTRACT

A method and apparatus are for surface finishing of pieces obtained by 3D printing. The piece to be treated and a liquid process plasticizer are heated together in a hermetically sealed treatment chamber up to a working temperature lower than the boiling temperature of the process plasticizer. The air/vapor mixture is maintained in continuous circulation in the chamber to keep the temperature and concentration uniform and to contact the piece with the air/vapor mixture to avoid condensate formation on the piece surface and allow process plasticizer vapors to be absorbed by the piece surface without condensate formation. Vapor exposure time is fixed depending on the desired penetration depth. A chamber has heaters, a ventilator for circulating the air/vapor mixture in the chamber to maintain uniform temperature and concentration conditions. A unit separates the process plasticizer vapors from the air/vapor mixture by condensation. A unit filters the residual air/vapor mixture.

2 Claims, 10 Drawing Sheets

(56) References Cited

U.S. PATENT DOCUMENTS

| | | | | |
|---|---|---|---|---|
| 2009/0321972 A1* | 12/2009 | Zinniel | ............... | B33Y 40/00 |
| | | | | 264/37.13 |
| 2016/0108522 A1* | 4/2016 | Donovan | ............ | B33Y 40/00 |
| | | | | 427/248.1 |
| 2018/0178241 A1* | 6/2018 | Luo | .................. | B29C 71/0009 |
| 2019/0375158 A1* | 12/2019 | Crabtree | ........... | B29C 71/0009 |

FOREIGN PATENT DOCUMENTS

| | | |
|---|---|---|
| WO | 2007/044007 A1 | 4/2007 |
| WO | 2009/140449 A2 | 11/2009 |
| WO | 2010/002643 A1 | 1/2010 |
| WO | 2016/201614 A1 | 12/2016 |

OTHER PUBLICATIONS

Italian Search Report for Italian Patent Application No. 102017000134861 dated Aug. 27, 2018, 1 page.

\* cited by examiner

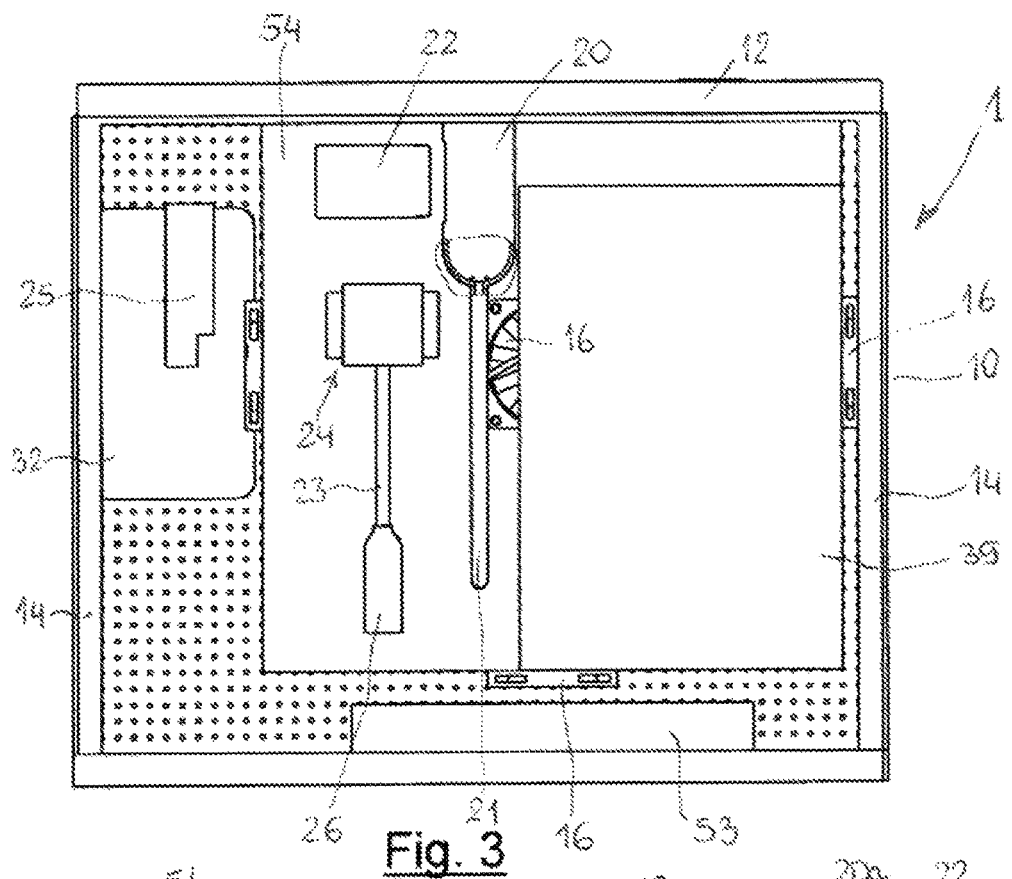
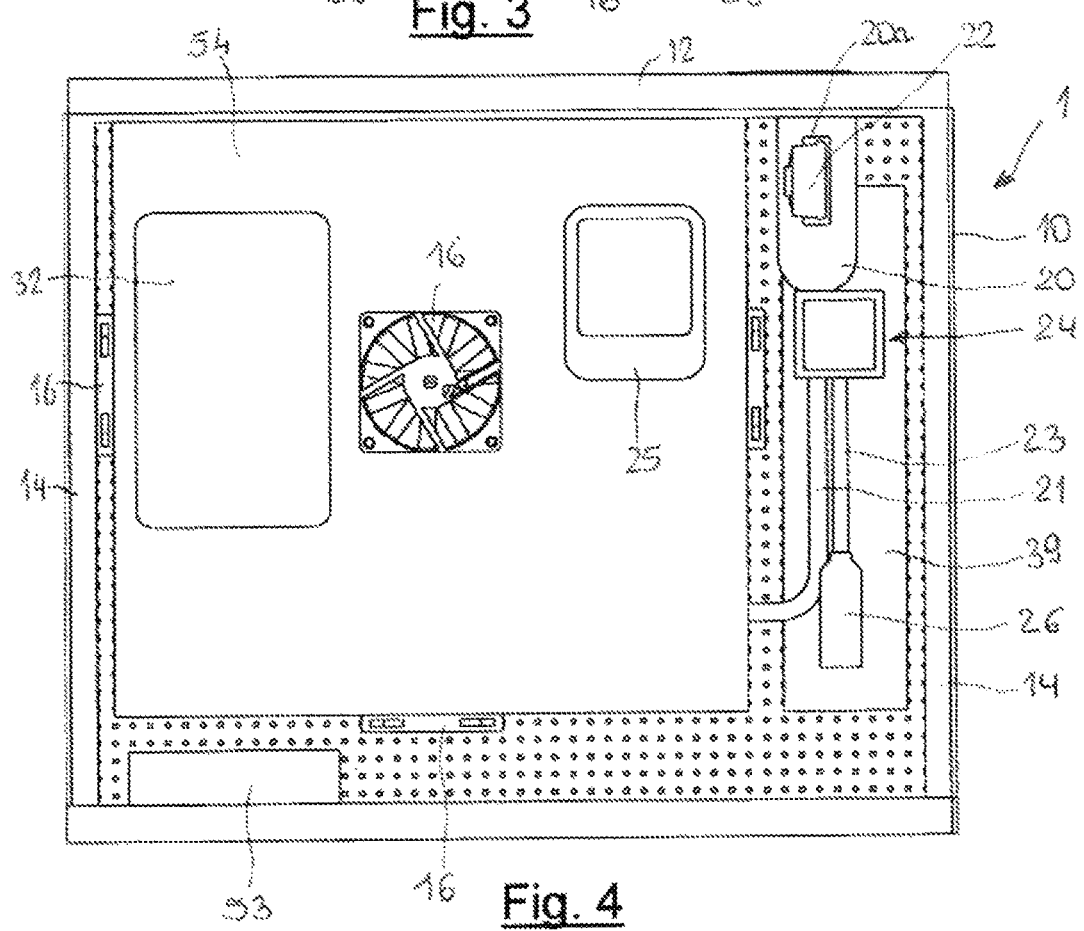

METHOD AND APPARATUS FOR SURFACE FINISHING OF ARTICLES PRODUCED BY 3D PRINTING

This application is a National Stage Application of PCT/IT2018/050113, filed 23 Jun. 2018, which claims the benefit of Ser. No. 10/201,7000070567, filed 23 Jun. 2017 in Italy and Serial No. 102017000134861, filed 23 Nov. 2017 in Italy, and which applications are incorporated herein by reference. To the extent appropriate, a claim of priority is made to each of the above-disclosed applications.

TECHNICAL FIELD

The present invention generally relates to the field of printing three dimensional objects (in the following "3D printing" for short) and in particular refers to a method for surface finishing of articles/objects (in the following also referred to as "pieces") obtained by 3D printing processes, especially those involving the use of polymeric materials to make the pieces. The invention also relates to an apparatus for surface finishing of pieces obtained by 3D printing.

BACKGROUND ART

As is known, 3D printing processes permit three-dimensional objects to be reproduced from corresponding models made by a 3D modelling software. Machines, apparatuses and entire systems based on such processes are spreading with increased rapidity on the market by virtue also of the reduction of their cost and of an increasingly diversified range of products put on the market covering from professional and/or industrial apparatus up to desktop-type, office and household machines.

The use of 3D printers has rapidly spread from rapid prototyping to a myriad of other applications in a wide variety of areas, from architecture to entertainment, from the biomedical sector to the aerospace sector, and many others.

In general, 3D printing processes involve layer-by-layer deposition of a suitable material to obtain an object in three dimensions. The more widespread technology, mainly by virtue of its low cost, is the deposition printing or FFM/FDM (Fused Filament Fabrication/Fused Deposition Modelling), wherein a polymeric filament is heated up to melting and passed through a nozzle that, under the guide of a software, while moving deposits the material to form overlapping layers. The more commonly used materials in this type of technology are ABS (acrylonitrile-butadiene-styrene) and PLA (polylactic acid). According to other technologies, powder polymeric or metallic materials or liquid polymeric materials are used.

The layer thickness is typically 50-100 micron, but a thickness in the range of 10 micron may be obtained, resulting however in longer manufacturing time. Finishing quality obviously is better by reducing layer thickness, but, nevertheless, the object surface is relatively streaked, uneven and porous, whereby the objects may either display undesired properties (for example, they may become soaked with liquid) or have an appearance unsuitable for their final destination (for example, in the case of decorative objects). In other instances, the surface unevenness does not meet desired requirements and/or dimensional tolerances (for example, where the object manufactured by 3D printing is a mould). In all these cases, and other ones not mentioned related to the quality of the produced piece, surface finishing treatments must be used.

A known method for the surface finishing of plastic material articles obtained, for example, by injection moulding, involves dipping the article in a solvent compatible with the plastic material or exposing the article to vapours of the solvent for a prefixed time sufficient to cause a limited surface solubilisation of plastic material which can flow on the surface on the article surface enough to smooth any roughness present thereon (see for example U.S. Pat. No. 5,448,838).

This method has been extended also to surface finishing of articles made of plastic material obtained by 3D printing. To this subject, see WO03/089218, WO2007/044007, WO2008/088761 and WO2010/002643. 3D pieces, after being produced in a 3D printer, are exposed to vapours of a suitable solvent compatible with the plastic material. Upon contacting the piece, the vapours condense thereon and soften the material to cause the materiel to flow on the surface, thus making the surface smooth. The piece gradually heats until the surface reaches the temperature of the boiling solvent and is constantly covered by solvent condensing on its surface until said temperature is reached. The piece remains exposed to the solvent vapours condensing thereon until the desired finishing degree is obtained and then it is removed from the vapours to allow it to dry through solvent re-evaporation.

Exposition time is decided by observing the solvent vapour condensation on the piece, and the piece may be removed from the vapour chamber when condensation ends, this indicating that the surface temperature of the piece reached the boiling temperature of the solvent. Furthermore the exposition time accounts for the type of solvent and material, the shape characteristics of the piece and the solvent vapour concentration.

This method entails the condensation of the solvent on the surface of the piece as an essential condition. However, a prolonged exposure to the condensed solvent, beside hindering vapour penetration in the surface, may result in erosion and surface runoff with loss of material, and moreover, since the condensate droplets may have preferential flow paths due to the shape of the piece, also the runoff may occur in an uneven manner thus resulting in localized condensate build-up. Furthermore, with the above described known method it is not possible to control the depth of solvent penetration below the surface of the piece.

As a solvent suitable for this application halogenated solvents have been proposed such as trichloroethylene, fluorocarbons and mixtures thereof, ketones such as acetone, methylethylketone, and the like to be selected according to the plastic material and operating conditions.

An apparatus for surface finishing of 3D printing pieces is also disclosed in WO2010002643. The apparatus involves the exposure of an article to solvent vapours to remove surface roughness and porosity and obtain a smooth, glossy surface. The apparatus is formed by a metallic containment box structure having a not-airtight lid, wherein a heated chamber is located. In said chamber the solvent is first vaporized and then the 3D piece to be treated is arranged. The piece is cold or possibly pre-cooled. The containment box structure also houses a drying chamber separated from the heated chamber, in which the 3D piece is transferred at the end of the solvent treatment to remove the solvent therefrom. The drying chamber is maintained to a temperature lower than room temperature to speed up the solvent removal process. Above the heated chamber there is provided a cooling coil to condense the vapours of the solvent which is passed through a water separator before being sent to a solvent collection tank to be re-used.

The apparatus according to the above patent application operates at atmospheric pressure and the heated chamber is kept open during the treatment of the piece to allow the operator to keep the piece suspended in the solvent vapour atmosphere during the whole treatment and to control the result of the treatment. As a solvent a fluorocarbon is used.

The sequence of the operative steps involves first heating of the chamber, wherein liquid solvent has already been charged, to produce solvent vapours, and then dipping the piece in the solvent vapour atmosphere. The solvent vapours are at the operative temperature, whereas the piece is at room temperature at first, whereby necessarily vapour condenses thereon and gradually heats it until an thermal equilibrium condition is reached between the operating temperature and the piece surface temperature. In this condition, the vapour condensation on the piece stops and the treatment ends. Normally the treatment duration (which may be repeated if considered unsatisfactory) is less than few minutes, in some case in the order of 30 seconds.

The above described apparatus is very complex and expensive and uses a highly expensive solvent; therefore it can be of interest for special industrial applications only. Furthermore, since a minimum level of solvent of 0.5 inches has to be maintained at the bottom of the chamber where the solvent is vaporized, the necessary amount of solvent is predictable to be rather high, of the order of some litres. Still, the need of conducting the treatment with the vapour chamber open results in risk of working environment pollution as well as possible risks for operator health holding the piece dipping in the vapour chamber, whereby suitable aspiration systems must be provided. Finally, the transfer of the piece to the drying chamber is an operating complication even in view of the semi-fluid condition of the piece surface at the end of the period of solvent exposure.

Therefore, there is a very felt need for being able to perform surface finishing of pieces mad of plastic material obtained by 3D printing in an effective, quick and safe way and at a cost affordable even for household and office use.

DISCLOSURE OF INVENTION

The object of the present invention is, therefore, to provide a method for surface finishing of pieces made of plastic material obtained by 3D printing which allows a finishing degree and quality to be achieved at least comparable to that obtainable with known methods and without having the inconveniences due to the formation of a condensate on the surface of the piece.

A particular object of the present invention is to provide a method of the above mentioned type which allows the treatment intensity to be modulated according to the needs, in particular to control the penetration depth of the vapours which the piece is exposed to.

Another important object of the present invention is to provide an apparatus for surface finishing of pieces made of plastic material obtained by 3D printing capable of operating according to the above mentioned method which would have a small size, in line with the working space of most of 3D printers.

Another object of the present invention is to provide an apparatus of the above mentioned type which is easy to use both by a professional (architect, designer, design offices, and the like) and a private individual and passionate about 3D printing even without a sufficient technical skill in the surface finishing techniques.

A further object of the present invention is to provide an apparatus of the above mentioned type which does not require the piece to be displaced at an intermediate step of the treatment.

It is another object of the present invention to provide an apparatus of the above mentioned type which can be used without the need for additional equipment for its use (a fume hood, for example).

It is still another object of the present invention to provide an apparatus of the above mentioned type which is safely usable by the operator, which is never requested to come into direct contact with process material, whether in liquid or vapour form.

A further object of the present invention to provide an apparatus of the above mentioned type which is remotely controllable and programmable by the user.

According to an important feature of the method according to the present invention the piece (or pieces) obtained by 3D printing is placed in an hermetically sealable chamber equipped with heating means. In said chamber there is fed a controlled amount of a liquid process plasticizer, that is collected in a bottom area of the chamber. Upon activation of the heating means, the liquid plasticizer is heated and a mixture of air and vapours of said process plasticizer is formed in said chamber, said mixture being kept in circulation to obtain an uniform distribution in the whole chamber and an uniform contact with the piece surface which is gradually heated until a working temperature lower than the boiling temperature of said process plasticizer is reached. The piece is maintained into contact with the process plasticizer vapours for a prefixed time to allow the vapours to be absorbed by the piece surface up to a desired depth, related to the contact time and obtaining a corresponding softening of the plastic material, the working temperature being slightly above the glass transition temperature of the mixture between plastic material and process plasticizer vapour absorbed therein. Once the prefixed time has lapsed, the air/vapours mixture is sent to a separation unit of the process plasticizer from the air/vapour mixture by condensation external to said chamber. At the end of the separation step, the treated piece is then removed from the chamber.

By operating in this way, namely by maintaining a condition of substantially equal temperature between the piece surface and the air/vapour mixture contacting it, also referred to as thermal equilibrium condition, vapour condensation and, therefore, softening due to solubilisation of the surface piece layer are avoided, and the vapours absorption and, therefore, softening due to surface plasticization is promoted.

According to a preferred embodiment of the method according to the invention, the working temperature is not beyond 10° C. higher than the glass transition temperature of said mixture, preferably not beyond 5° C. higher, and the piece exposure time to process plasticizer vapours is in the range of 20 to 80 minutes.

According to another feature of the method according to the invention, the process plasticizer is supplied in pre-packaged doses of a volume suited to the volume of the treatment chamber. According to particular embodiments of the invention, the process plasticizer volume is in the range of 2 to 10 ml per litre of volume of the chamber, preferably 2 to 5 ml.

According to another important feature of the invention, the apparatus comprises:
    a) a hermetically sealable chamber for containing at least one piece in the need of such a treatment;

b) means for supplying a controlled amount of a liquid process plasticizer to a bottom portion of said chamber;
c) heating means placed at least in said bottom portion of said chamber for heating said liquid process plasticizer, thereby forming a mixture of air and vapours of said process plasticizer, and for raising the temperature of said air/vapours mixture to a working temperature lower than the boiling temperature of said process plasticizer and slightly higher than the glass transition temperature of said plastic material;
d) means for keeping a uniform circulation of said air/vapours mixture in said chamber, during the heating step and during the step of maintaining at said working temperature for a prefixed time sufficient to allow a direct contact of said plasticizer vapours with the surface of said piece and the absorption of said vapours up to a desired depth under the surface of the piece;
e) means for separating said process plasticizer vapours from said air/vapours mixture by condensation, said separation means being external with respect to said chamber and capable of being placed into communication with said chamber once said prefixed contact time has lapsed.

In a preferred embodiment of the apparatus according to the present invention, a feeder of pre-packaged doses of the process plasticizer, in the form of pierceable capsules, is provided comprising an housing at one side of the treatment chamber, and means for cutting or piercing the capsule at the bottom of the housing and letting its content flow into the chamber through a conduit. Preferably detection means are provided to enable capsule cutting or piercing. Preferably, detection means are of the optical type. In this way, process plasticizer feeding operation is simplified as much as possible, thereby avoiding any risk of contact with the user and achieving a very compact layout of the apparatus.

According to a preferred embodiment of the apparatus of the invention, a condenser of the thermoelectric type using Peltier cells is adopted for the separation of the process plasticizer from the air/vapours mixture coming from the treatment chamber at the end of the heating step. Peltier cell cooling can be performed either using a cooling fluid in a closed circuit or by air. The structure of the condensation group is extremely compact and moreover any risk of losses to the environment is avoided because the condenser body can be made hermetically sealed.

In another particular embodiment of the invention, the Peltier cell condenser directly communicates with the treatment chamber through at least one inlet opening of the mixture rich of process plasticizer vapours and at least one return opening of the mixture lean of process plasticizer vapours facing to the chamber inside, and means are provided for circulating the mixture through the condenser at at least one of the openings. Advantageously, the same circulation means also provide for maintaining an uniform circulation of the air/vapours mixture in the chamber during the treatment of the piece when the condenser is not in operation.

According to a still further feature of the apparatus of the invention, all its components (treatment chamber, process plasticizer feeding unit, condenser group and cooling fluid circuit, as well as residual mixture filtration unit) are contained in an external housing of relatively small size of the order of that of a common 3D printer and the inside of the housing is easily accessible through an upper opening hermetically sealable with a cover.

BRIEF DESCRIPTION OF THE DRAWINGS

Further characteristics and advantages of the method and the apparatus for surface finishing of pieces made of plastic material obtained by 3D printing will be apparent from the following, exemplifying and not limiting description of embodiments thereof made with reference to the attached drawings, in which:

FIG. 3 is a cross-sectional view of the apparatus made along a vertical plane of trace B in FIG. 1 and in the direction of arrow III, this section being referred to as side section;

FIG. 4 is a cross-sectional view of the apparatus made along a vertical plane of trace C in FIG. 1 and in the direction of arrow IV, this section being referred to as back section;

DETAILED DESCRIPTION OF THE INVENTION

Figure 1:
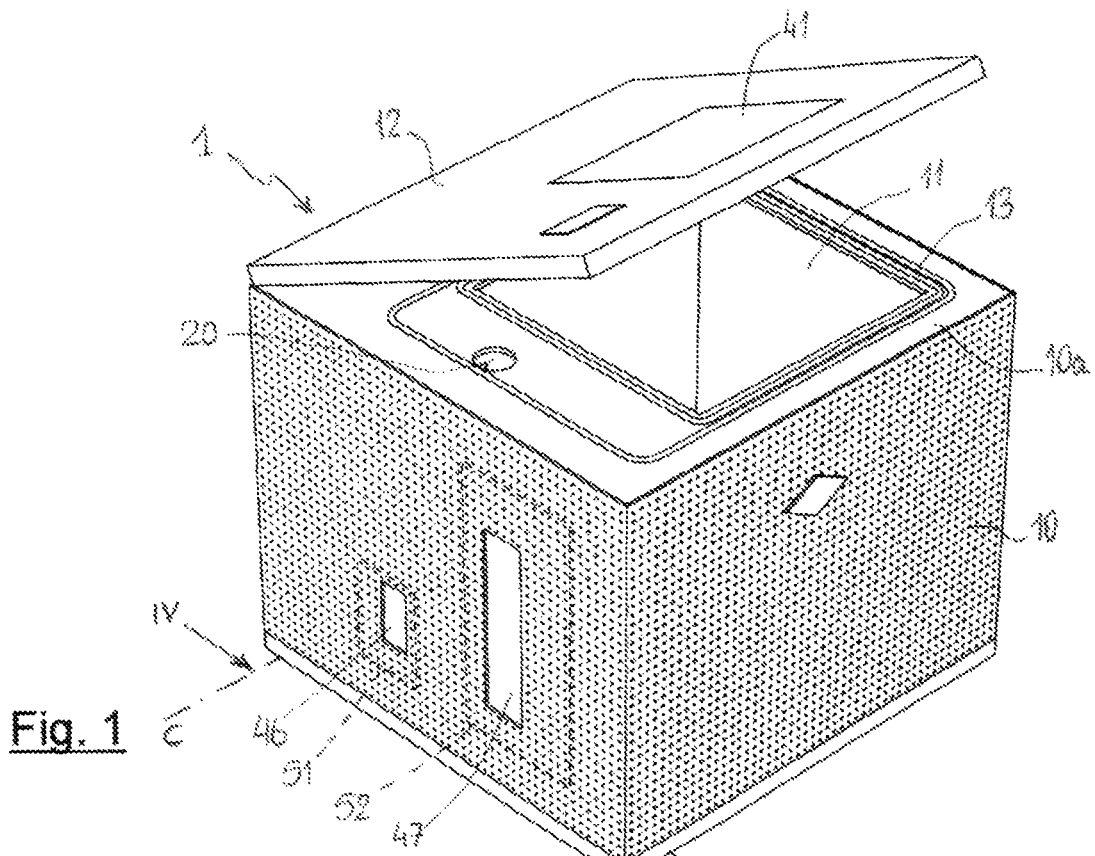
FIG. 1 is a perspective view of the apparatus according to the present invention.

The method of the present invention can be employed to treat objects, or pieces, made of plastic material obtained by 3D printing (in the following, "3D pieces" or "pieces"), in particular by using the above cited printing process known as FFF/FDM, wherein a polymeric filament is melt heated and passed through a nozzle that, under the guide of a modelling software, moves while depositing material to form successive layers overlapping to one another to form the desired object. The object made in this way is featured by substantially step-wise, wrinkled and streaked appearance of its surface and this generally constitutes a defect, from an aesthetical and/or functional point of view, which must be eliminated.

To this end, according to the present invention, the 3D piece is suspended, or in any other way placed, in a hermetically sealable chamber in which a process plasticizer compatible with the plastic material constituting the 3D piece is also fed.

With the term "process plasticizer", in the context of the present description and the attached claims, it is meant a vaporizable substance capable to be absorbed as a vapour in the plastic material and forming an intimate mixture therewith to lower its glass transition temperature ($T_G$) to such an extent as to cause a softening of the surface layers of the 3D piece, and to be released upon 3D piece cooling following evaporation from its surface. Without wishing to be bonded to any specific mechanism of action, it is considered that the process plasticizer is not chemically bonded to the polymeric material, but it form an homogeneous mixture with said material or one of its components to lower the $T_G$. The softening of the surface layers of the 3D piece causes a structural rearrangement that, as a function of the vapour penetration depth, may result in the desired surface smoothing and furthermore also in a change of the structure of the inner layers promoting the mutual penetration thereof and homogenizing the 3D piece morphology.

Clearly, for every type of polymeric material, either amorphous or semi-crystalline, constituting the 3D piece, several substances could exist that are usable as process plasticizer and among them some will be preferred. For example, in the case of a 3D piece made in ABS, substances of the above mentioned type can be low-boiling ketones such as acetone and methylethylketone, or even halogenated compounds such as dichloromethane and fluorocarbons, even if ketones are preferred in the method of the present invention at least in that they are water soluble.

With the term "surface finishing", as used in the context of the present description and the attached claims, it is meant a treatment, done with the vapours of the process plasticizer compatible with the material constituting the 3D piece, which can be extended to the layers of material underlying the surface layer for a depth typically up to 3 mm, but even greater if this could be necessary, thereby obtaining, in addition to a smooth surface as requested, also an improvement of the surface mechanical resistance.

After the piece to be treated is set in the chamber and the process plasticizer is fed therein in the liquid state, the chamber is hermetically closed and heat is supplied to the inside of the chamber to heat the 3D piece and the process plasticizer until a working temperature is reached that is suitably lower than the boiling temperature of the process plasticizer at the working pressure. The working pressure is substantially equal to the atmospheric pressure plus the vapour pressure of the process plasticizer at the working temperature. An important condition to be satisfied is that the 3D piece heats up at the same rate as the temperature increase of the process plasticizer and that the temperature inside the chamber would be as much uniform as possible both during the heat up step and once the working temperature has reached to ensure a substantial thermal equilibrium between the surface of the piece under treatment and the air/vapour mixture.

The operating parameters are the working temperature and the treatment duration, namely the exposure time of the 3D piece to the vapours of the process plasticizer. During the whole time the 3D piece is exposed to the process plasticizer vapours, the 3D piece must remain in thermal equilibrium with these vapours and must be kept at such a temperature as to prevent the condensation of the process plasticizer on the surface thereof.

The working temperature depends on the material constituting the 3D piece, in particular on its glass transition temperature and that of the liquid used as process plasticizer, as well as the weight ratio of the polymer and the absorbed process plasticizer.

In particular, the working temperature ($T_{es}$) must be greater than the glass transition temperature of the plasticized polymer, namely the mixture consisting of the polymer and the process plasticizer absorbed therein and therefore also depends on the weight concentration of the process plasticizer in said mixture. Empirical formulas exist, well known to the person skilled in the art, for example Fox's equation ($1/T_{mis} = w_p/T_p + w_{pi}/T_{pl}$, where $T_{mis}$, $T_p$ and $T_{pl}$ are the glass transition temperatures of the plasticized polymer, the pure polymer and, respectively, the process plasticizer; $w_p$ and $w_{pi}$ are the weight fractions of pure polymer and absorbed process plasticizer; and, $w_p + w_{pi} = 1$), to obtain a rough estimate of the glass transition temperature of a polymeric mixture.

For the purposes of the present invention, namely to maintain such a surface softening of the piece during the treatment as to allow a structural rearrangement of the surface layers of the piece, it is sufficient that the working temperature $T_{es}$ be slightly higher, i.e. be some degrees ° C. higher than the glass transition temperature $T_{mis}$ of the polymer/process plasticizer mixture, generally not more than 10° C., and in practice preferably not more than 5° C.

Unlike the process of solubilisation of the 3D piece surface layer occurring according the known methods due to the action of the solvent condensed on its surface, the absorption of process plasticizer vapours according to the present invention is a relatively slow process and the depth of penetration of the process plasticizer in the polymer, and thus the depth of the softening effect, is determined by the time duration of the exposure to vapours at the working temperature, which ranges from 20 to 80 minutes.

In an exemplifying embodiment of the invention, in which the material constituting the 3D piece is ABS and the process plasticizer is acetone, the working temperature is comprised between 30 and 40° C. and the exposure time of the 3D piece to acetone vapours ranges from 20 to 60 minutes, preferably 30 to 50 minutes, while the working pressure ranges from 125 to 150 kPa.

The exposure time of the 3D piece to process plasticizer vapours determines, as already said, the depth of vapour penetration and, consequently, the effects produced by the treatment. As an indication, in the embodiment mentioned above, relatively short exposure time, in the order of 20-30 minutes, results in a penetration depth of 100-200 μm, whereas relatively long exposure time, in the order of 50-60 minutes, the penetration depth may reach 2-3 mm. Effects are different in either cases. In the first case, a 3D piece surface layer is caused to soften and, as a result, the surface material is caused to flow, thus obtaining the desired effect of smoothing of surface unevenness (steps, porosity, streaking, and the like). In the second case, in addition to the surface smoothing effect, a relatively deep softening and material flowing action occurs, involving the layers below the surface for a depth related to the vapour exposure time. In this case, the involved layers become softer and interpenetrate in a single layer, thus increasing the mechanical resistance of the 3D piece surface.

Thanks to this feature of the method according to the invention, it is possible to modulate the exposure duration of the 3D piece to process plasticizer vapours and, as a result, the desired type of surface finishing can be selected, from a simple smoothing and polishing of the surface with a relatively short exposure time, to also an increase of the mechanical resistance of the 3D piece with a relatively longer treatment time. In this respect, it is worth noting that with known methods it would be impossible to work with exposure time of such extent because the sustained exposure of the 3D piece surface to the condensed solvent would result in unacceptable material runoff.

The necessary amount of process plasticizer is preferably provided as pre-packaged doses. The volume of such doses of process plasticizer necessary in the method according to the invention is suited to the volume of the chamber where the working cycle is conducted. As an example, a dose of 60-80 ml of acetone is sufficient for a treatment chamber of 27 litres volume and containing a 3D piece in ABS to be treated. In general, 2 to 10 ml, preferably 2 to 5 ml of process plasticizer per litre of chamber volume will be necessary to obtain the desired surface finishing of the piece.

Once the time set for the exposure to process plasticizer vapours has lapsed, heating is stopped and, without removing the treated piece from the chamber, a step of circulation of the air/vapour mixture between the treatment chamber and an air/vapour separation unit is activated. In the separation unit most part of the process plasticizer vapour present in the air/vapour mixture is separated by condensation, while the piece, in the treatment chamber, cools down releasing the absorbed process plasticizer vapours. The residual part of process plasticizer, which cannot be condensed, is removed by filtration by bubbling the lean air/vapour mixture in a liquid means providing for its absorption or neutralization depending on the chemical features of the process plasticizer.

In an equivalent alternative embodiment of the method according to the invention, the 3D piece and the process plasticizer in liquid form present in the treatment chamber are rapidly heated up to a temperature higher than the working temperature (in the case ABS/acetone, to a temperature higher than 50° C., preferably not higher than 70-80° C. to avoid any risk of damaging the 3D piece to be treated) and then it is let cool down naturally up to the working temperature, or heat is removed by cooling means to speed up the process. Also in this case, it is important to maintain a utmost uniform temperature inside the chamber by a continuous circulation of the mixture formed by air a process plasticizer vapours.

In a further embodiment of the invention, the treatment of surface finishing of the 3D piece can be conducted in an inert atmosphere, such as a $CO_2$ or $N_2$ atmosphere. This solution can be advantageous when it is necessary to be absolutely certain that a combustion reaction would be physically impossible to take place.

Still according to another embodiment of the method of the invention, the surface finishing treatment of the 3D piece can be conducted at an operative pressure lower than the atmospheric pressure. This can be necessary when plastic material forming the 3D piece requires, or is compatible with a process plasticizer having a low vapour pressure and/or a relatively high boiling point at atmospheric pressure, whereby correspondingly high working temperatures would be necessary. For example, in the case of a 3D piece made of polylactic acid, it could be advantageous to use 1,2-dichloroethane as a process plasticizer, which at atmospheric pressure boils at 84° C. and at a working temperature of 30-40° C. has a too low vapour pressure to generate an air/2,2-dichloroethane vapour mixture suitable to achieve the surface softening of the piece. In contrast, such working temperature can be used when operating at a reduced pressure of about 270 mmHg.

Figure 2:
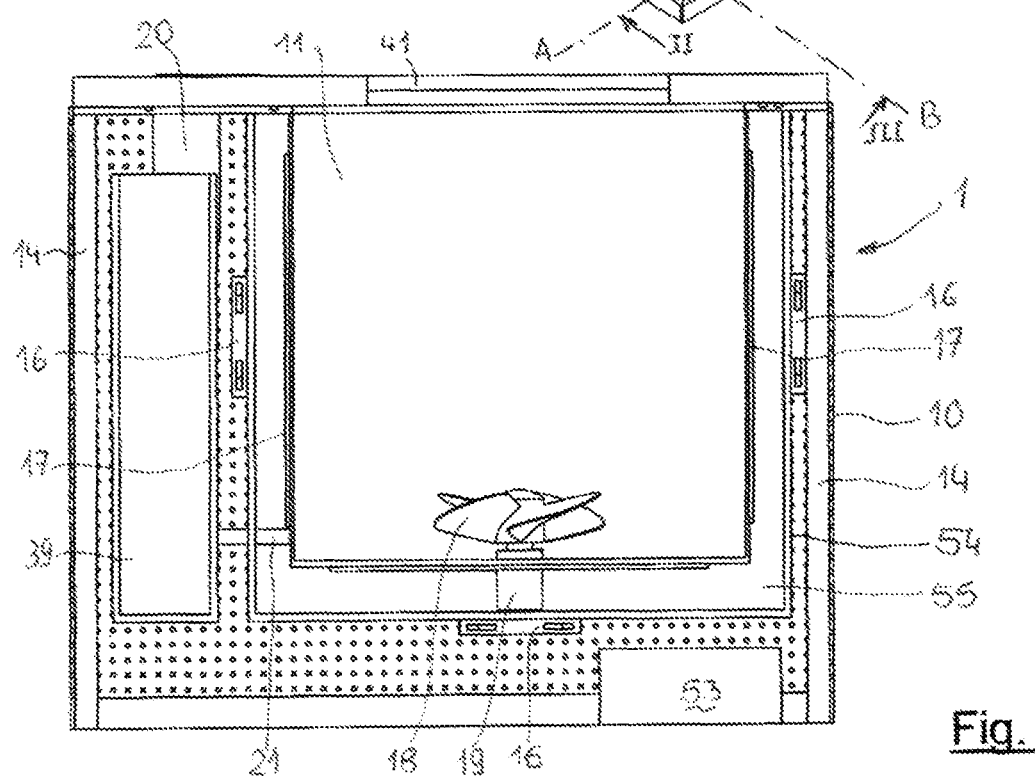
FIG. 2 in a cross-sectional view of the apparatus made along a vertical plane of trace A in FIG. 1 and in the direction of arrow II, this section being referred to as front section.

According to the invention there is also provided an apparatus for surface finishing of pieces made of plastic material obtained by 3D printing ["3D piece(s)"]. With reference to FIGS. 1 and 2, the apparatus according to the invention, generally indicated at 1, comprises an outer housing 10, being of a generally parallelepiped shape, made of metal or any other suitable stiff material, wherein a tank-shaped chamber 11 is placed, which is hermetically sealable by a cover 12 hinged to an edge of housing 10. In particular, housing 10 has an upper face 10a, from which tank 1 is accessible, and cover 12 is hinged to a side of face 10a. The airtight seal between cover 12 and tank 11 is ensured by seals 13, for example of the o-ring type, arranged over the edge of tank 11.

Tank 11 is designed to contain one piece, or more pieces, coming from a 3D printing process and requiring a surface finishing treatment through exposure to vapours of a suitable process plasticizer, as defined above. Tank 11 is made in a material capable of resisting to the contact with the vapours of said process plasticizer at the temperature and pressure conditions of the treatment, and is preferably made of steel.

Outer housing 10 serves as a protective container for tank 11 and the other components of the apparatus, arranged in the gap between housing 10 and tank 11, and comprises an inner structure holding tank 11 and these components. In particular the structure, indicated at 14 in FIGS. 2, 3 and 4 is formed by a metal frame defining the inner edges of housing 10, by which tank 11 and the other components are supported by means of cross bars and brackets not shown.

As shown in FIG. 2, an heating member 15 is fixed to the outer side of the bottom of tank 11, as well as cooling fans 16 are provided at each of side walls and bottom of an inner housing 54 of tank 11, delimiting an insulating space 55 around tank 11. Optionally, further heating members 17 may be provided even at the side walls of tank 11.

At the bottom of tank 11 there is arranged an inner fan 18 actuated by a motor 19, which serves to ensure an homogeneous diffusion of the mixture formed by air and process plasticizer vapours (in the present description and attached claims also referred to as "air/vapour mixture") inside tank 11, in particular to avoid the vapours stratifying at the bottom thereof and contribute to even the temperature of the mixture inside the tank.

In a particularly preferred embodiment of the invention there is provided a process plasticizer feeding system which uses dosed amounts of plasticizer in the form of pre-packaged doses. The plasticizer feeding system, schematically shown in FIG. 3, is placed next to tank 11, outside inner housing 54. Process plasticizer feeding system comprises an housing 20 for a capsule C containing the plasticizer, accessible by raising cover 12. After positioning capsule C in housing 20, upon closing cover 12 a suitable piercing mechanism pierces the capsule, whereby the plasticizer contained therein comes out and flows through a conduit 21 extending from the bottom of housing 20 to the inside of tank 11 near its bottom.

Figure 7:
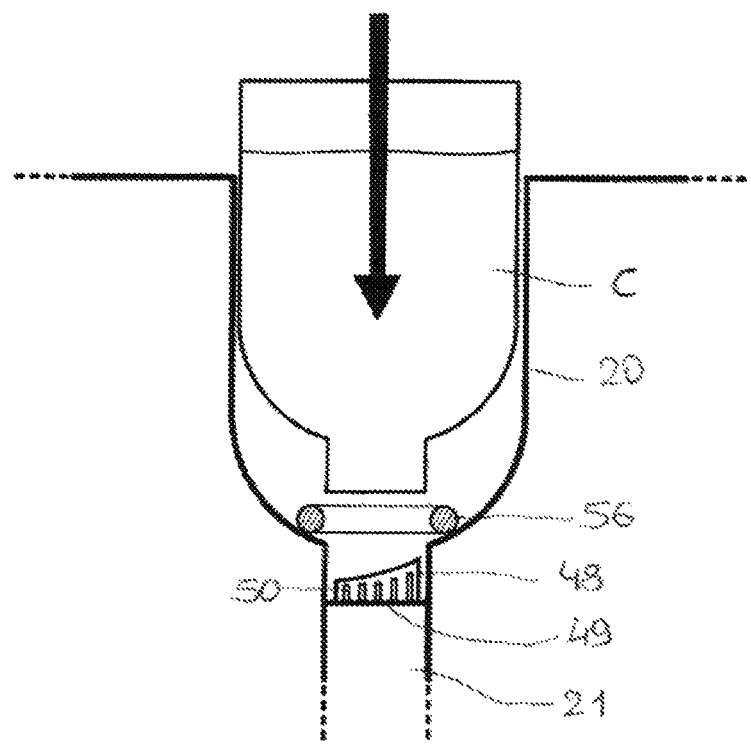
FIG. 7 is an enlarged view of a device for feeding process plasticizer capsules according to an exemplifying embodiment of the invention.

In FIG. 7 an enlarged axial sectional view of the process plasticizer feeding system is shown. A seal 56 is provided at the bottom of housing 20 placed between capsule C and the bottom wall of housing 20 around the inlet of conduit 21 to prevent process plasticizer vapours from escaping during the treatment. In FIG. 7 there is also shown an embodiment of the piercing mechanism of a capsule C containing a dose of process plasticizer which the apparatus of the invention is equipped of. The piercing mechanism comprises a blade 48 circular or semi-circular in shape, coaxial to conduit 21, extending at the bottom of capsule housing 20 from a perforated plate 49 crosswise arranged near the inlet of conduit 21. The blade surface has abutments or bosses 50 parallel to the conduit 21 axis for pushing upwards the closure foil of capsule C, once it has cut, thus helping process plasticizer rapidly outflow from capsule C. Obviously, other equivalent piercing systems, known in the field, can be used as an alternative.

The feeding system further comprises a capsule recognition system, designed to identify the capsule as new and of certified origin, comprising an optical reader 22 for reading a bar code or a RFID tag printed, applied or otherwise provided on the capsule. Optical reader 22 is placed next to housing 20 and can read the code or tag on the capsule once the capsule is positioned in housing 20 through a windows 20a formed on the wall of housing 20. The positive result of the reading enables the closure of cover 12.

The apparatus further comprises a recovery system by condensation of the evaporated process plasticizer coming into operation at the end of a treatment cycle. More in particular, the process plasticizer recovery system comprises a plasticizer condenser 24, fed with air/vapour mixture coming from tank 11 through an explosion-proof pump 25 for feeding the air/vapour mixture, and a used plasticizer collection tank 26 receiving the condensed process plasticizer through a conduit 23, while air is sucked from the same pump 25 and returned to tank 11.

Figure 5:
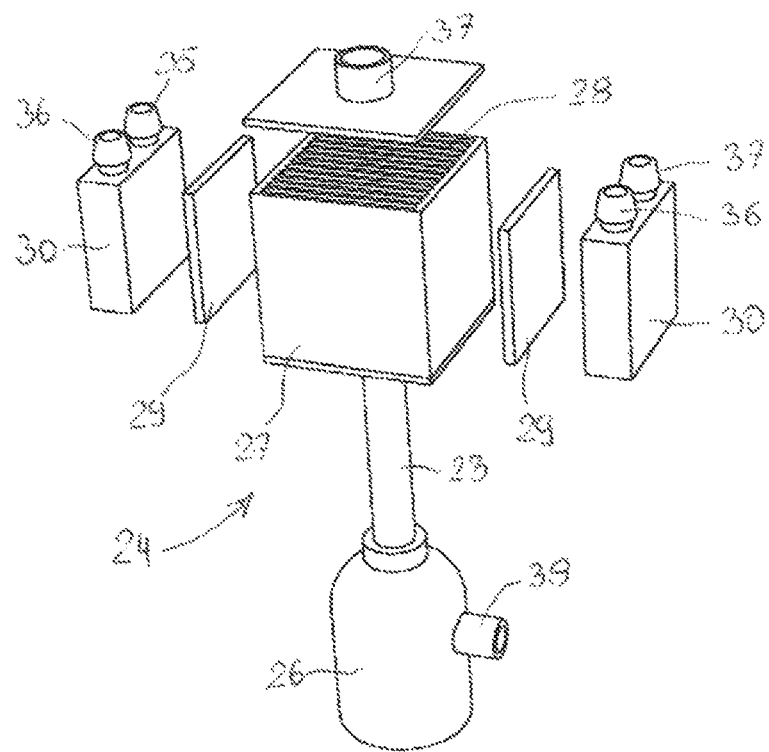
FIG. 5 is an exploded and enlarged perspective view of the condenser unit internal to the apparatus according to the invention.

As shown in FIG. 5, in the present embodiment of the invention condenser 24 is a thermoelectric type condenser comprising a hollow right prismatic body 27, in particular with a square base, made of metal, with fins 28 inside of the same metallic material as that of body 27. The air/vapour mixture circulates in body 27 and the process plasticizer condenses therein. Body 27 is hermetically insulated from outside to avoid any risk of process plasticizer vapour leakages. Fins 28 are placed into contact to the inner surface of body 27, so as to ensure thermal continuity, and evenly occupy the volume of body 27. Two Peltier cells 29 with their cold side facing towards body 27 are arranged on two respective opposite sides of body 27. The contact between the cold side of Peltier cells 29 and the respective sides of body 27 causes fins 28 to cool down. Metal coils 30, in which a cooling fluid circulates, are in contact to the hot side of Peltier cells to remove heat produced by the hot side of Peltier cells.

Figure 6:
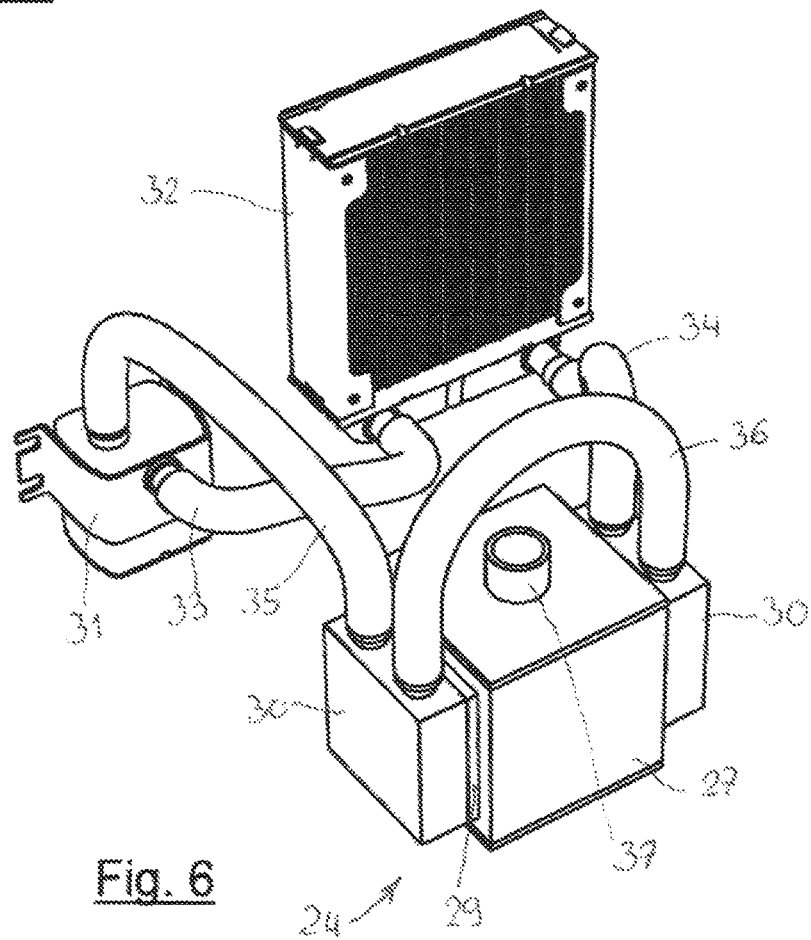
FIG. 6 is a perspective assembly of the condenser unit of FIG. 5.

As shown in FIG. 6, the cooling fluid circulates in a closed circuit comprising a circulating pump 31, a radiator 32 for exchanging heat transported by the cooling fluid, and conduits 33, 34, 35, respectively, between pump 31 and radiator 32, radiator 32 and a firs coil 30 and the other coil 30 and pump 31. The two coils 30 are connected in series through a further conduit 36. Radiator 32 discharges to the outside the produced hot air by means of a fan (not shown) and through a grid (also not shown) formed on the back face of outer housing 10.

In a further embodiment of the invention two additional Peltier cells can be provided (not shown) on the other two opposite side faces of body 27 with relevant cooling coils, to increase the cooling capacity of condenser 24.

Two connectors 37 (only one visible in FIG. 5) extend from upper face and lower face of body 27, for the conduit communicating condenser 24 with tank 11 and for the conduit 23 communicating condenser 24 with process plasticizer collection tank 26. In another embodiment of the invention, the condensed process plasticizer remains on the condenser bottom up to the end of the condensation step, and then is discharged by opening a dedicated valve.

The process plasticizer collection tank 26 has a connection 38 for a conduit (not shown) communicating with pump 25 to suck the mixture of air and uncondensed plasticizer and recycling it in tank 11 for a subsequent passage in condenser 24 until the content of process plasticizer reaches a prefixed value (for example, 70% of the amount entered with the capsule).

At the end of the condensation step, some process plasticizer in vapour phase mixed with air is still present in tank 11. To further reduce the amount of process plasticizer to a slightly detectable olfactory level, the air containing small amounts of process plasticizer vapours present in tank 11 is sucked by pump 25 and passed through a filter containing a liquid capable of absorbing or neutralizing the residual process plasticizer, for example a water filter 39 schematically shown in FIGS. 2, 3 and 4 when the process plasticizer is acetone or other water-soluble substance.

Figure 8:
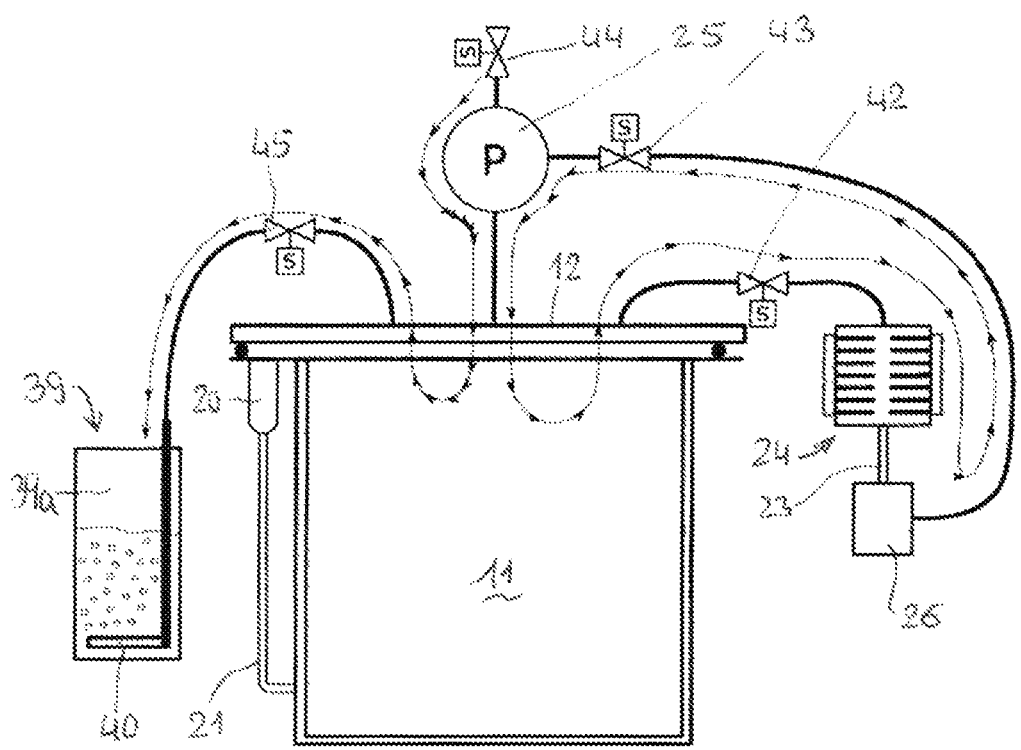
FIG. 8 schematically shows the process plasticizer cycle in the apparatus of the invention.

With reference also to FIG. 8, water filter 39 comprises a water filled container 39a where the sucked air is bubbled by means of an aerator device 40, of the commercial type (for example a mineral porous stone, micro-perforated pipe, and the like) capable of producing air bubbles as small as possible, being clear that the effectiveness of the filtration directly depends on this factor, as well as the path of the air bubble in water. The so treated air has such a residual content of process plasticizer as to be allowed the discharge to the atmosphere, as well as the concentration of the plasticizer in the filtering water is to such a level as the discharge to sewer is allowed. Obviously the above described washing system is usable only in the case in which the process plasticizer is water-soluble.

With reference to FIGS. 9 to 13 there is described another embodiment of an apparatus for surface finishing of articles obtained by 3D printing in which the method according to of the invention can be performed. This embodiment is designed to further improve the compactness of the apparatus. In FIGS. 9-12 and in FIGS. 1-7 the same components are indicated with the same reference numbers.

Figure 9:
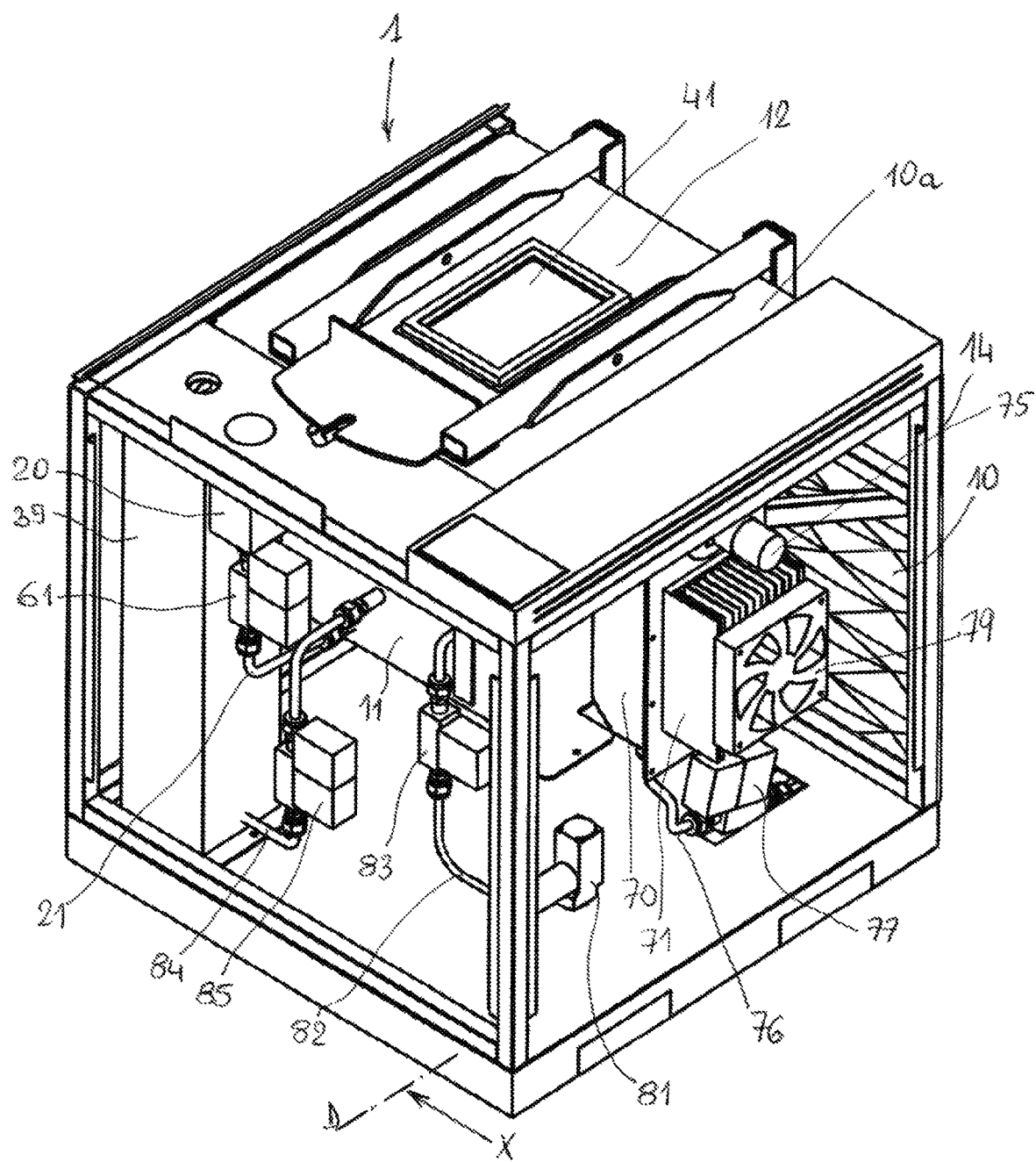
FIG. 9 is a perspective view of another embodiment of the apparatus according to the invention, the outer housing being partially removed to show the inner components.
Figure 10:
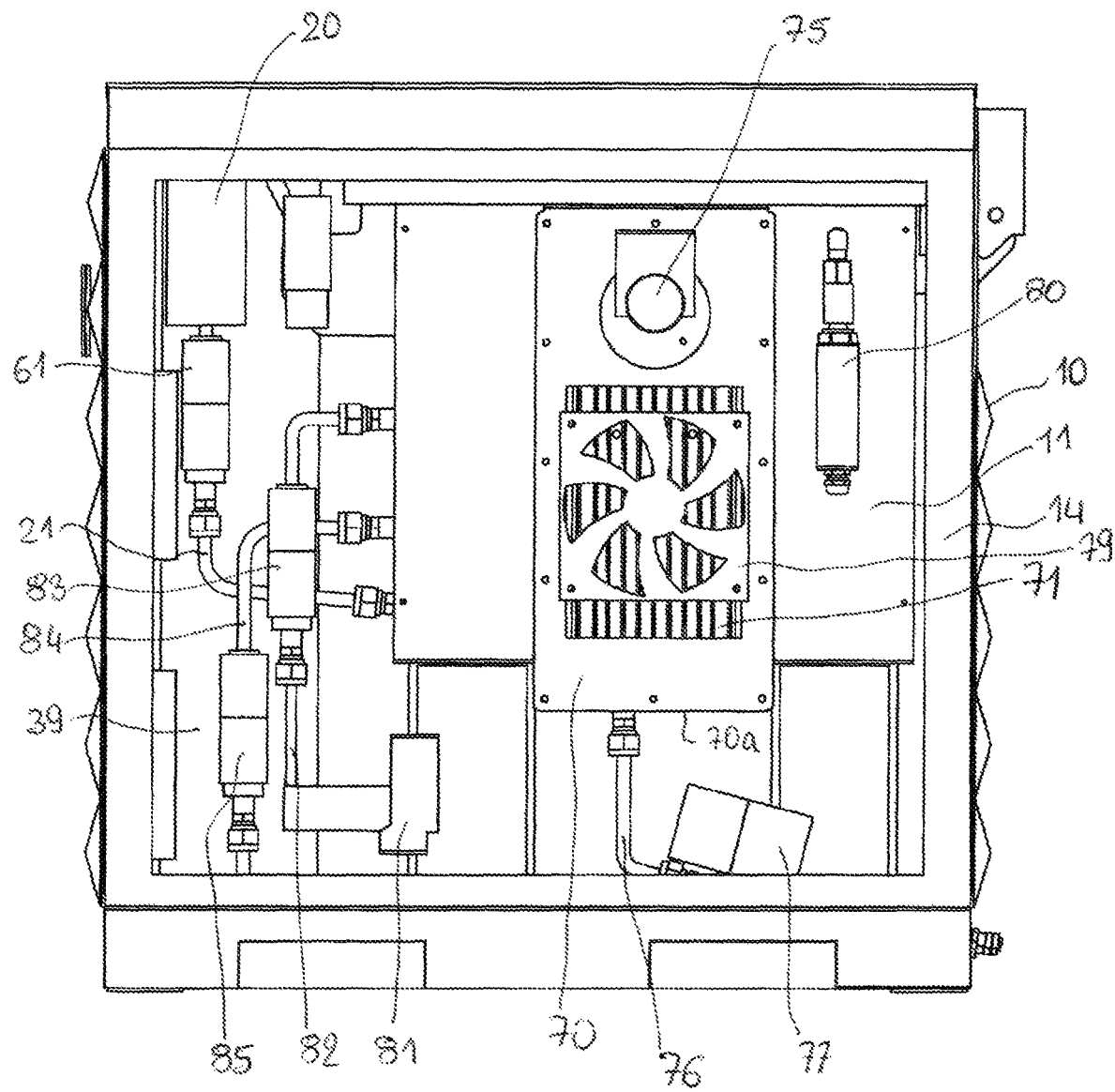
FIG. 10 is a cross-sectional view of the apparatus of FIG. 9 made according a vertical plane of trace D in FIG. 9 and in the direction of arrow X.

With particular reference to FIGS. 9 and 10, the apparatus according to the invention generally indicated at 1 comprises an outer housing 10 partially removed in the figures for sake of clarity, generally parallelepiped in shape, made of metal or other suitable stiff material, and a tank shaped chamber 11 hermetically sealable with a cover 12 hinged to an edge of housing 10. In particular, housing 10 has an upper face 10a, from which tank 11 is accessible, and cover 12 is hinged to a side of face 10a. The airtight seal between cover 12 and tank 11 is ensured by seals, not visible, for example of the o-ring type, placed along the edge of tank 11. A transparent windows 41 is provided on cover 12 to visually control the piece under treatment.

Outer housing 10 serves as protective container for tank 11 and the other components of the apparatus, arranged in the gap between housing 10 and tank 11, and comprises a structure 14 holding tank 11 and said components.

Like the embodiment described with reference to FIGS. 1 to 7, tank 11 is equipped with an heating member on the bottom (not shown), and further optional heating members may be provided at the side walls of tank 11.

Likewise, a process plasticizer feeding system is provided making use of dosed amounts of plasticizer in the form of pre-packaged capsules. Housing 20 for a capsule containing liquid plasticizer, capsule recognition system and the relevant piercing mechanism that perforates the capsule are shown in FIGS. 9 and 10, whereby the plasticizer contained in the capsule comes out and flows out through conduit 21 extending from the bottom of housing 20 to the inside of tank 11 near the bottom thereof. A solenoid valve 61 is mounted on conduit 21 to allow, when open, the liquid outflow towards tank 11 and ensure, when closed, tank 11 pressurization. As a piercing mechanism, the one already described with reference to FIG. 7 is used, but any equivalent perforation system, known in the art, may be used as an alternative.

Figure 11:
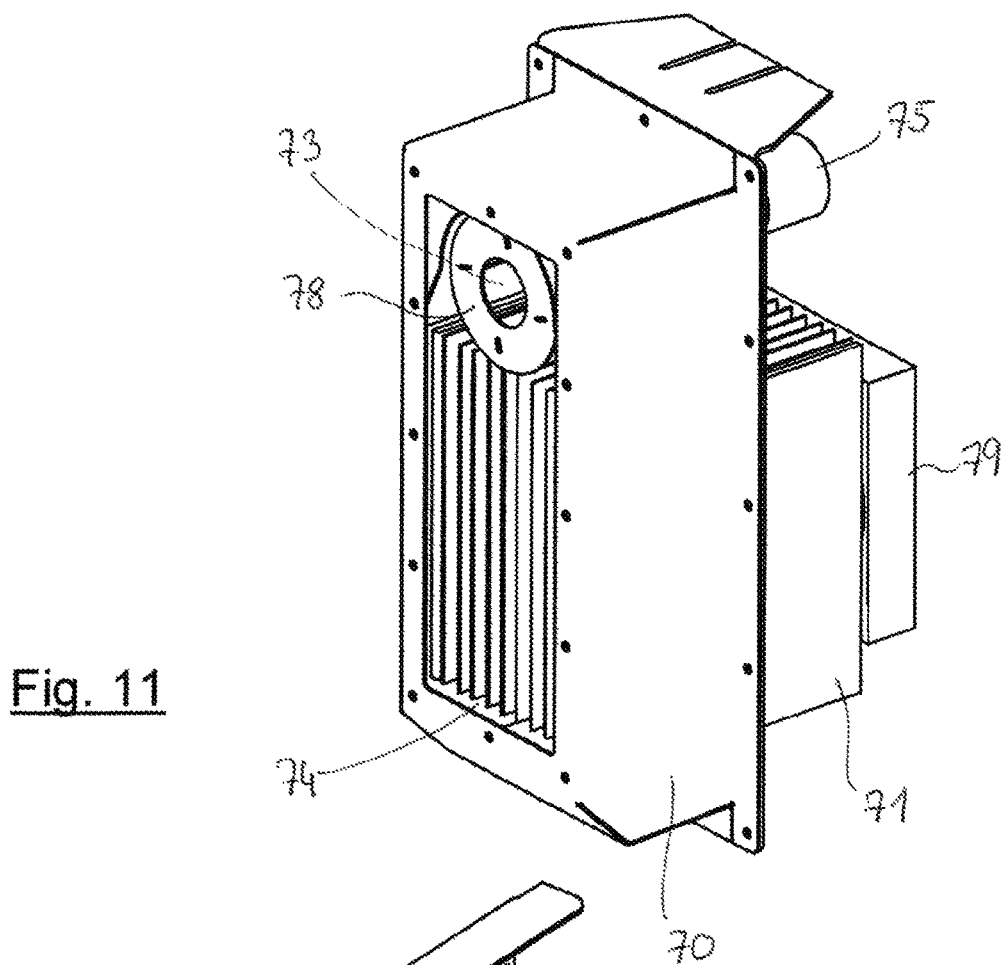
FIG. 11 is a perspective view of the condenser unit as seen from the inner side of the chamber.
Figure 12:
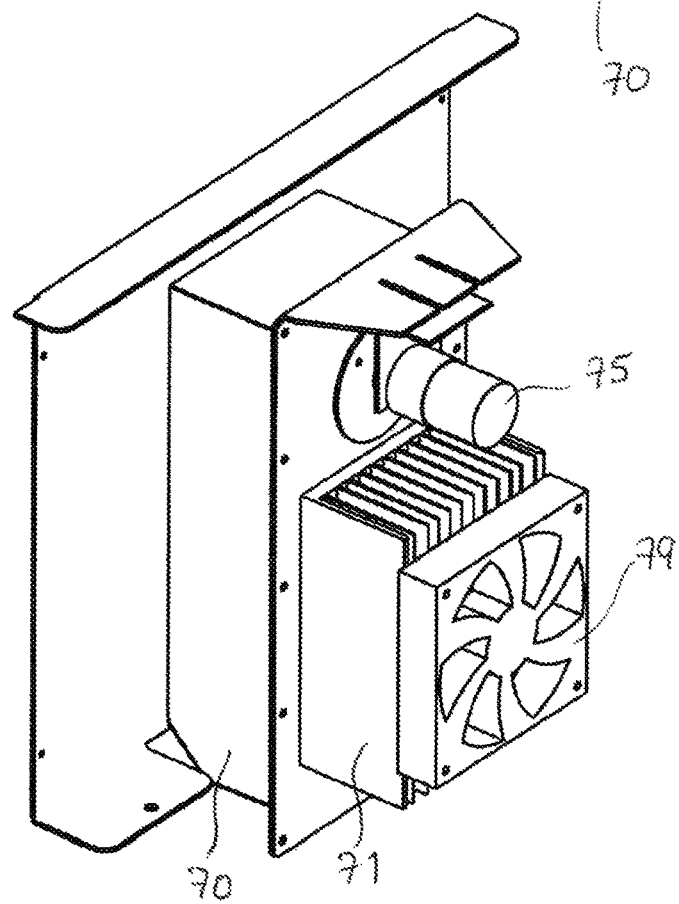
FIG. 12 is a perspective view of the condenser unit as seen from the outer side, namely the side opposite to that of FIG. 11.
Figure 13:
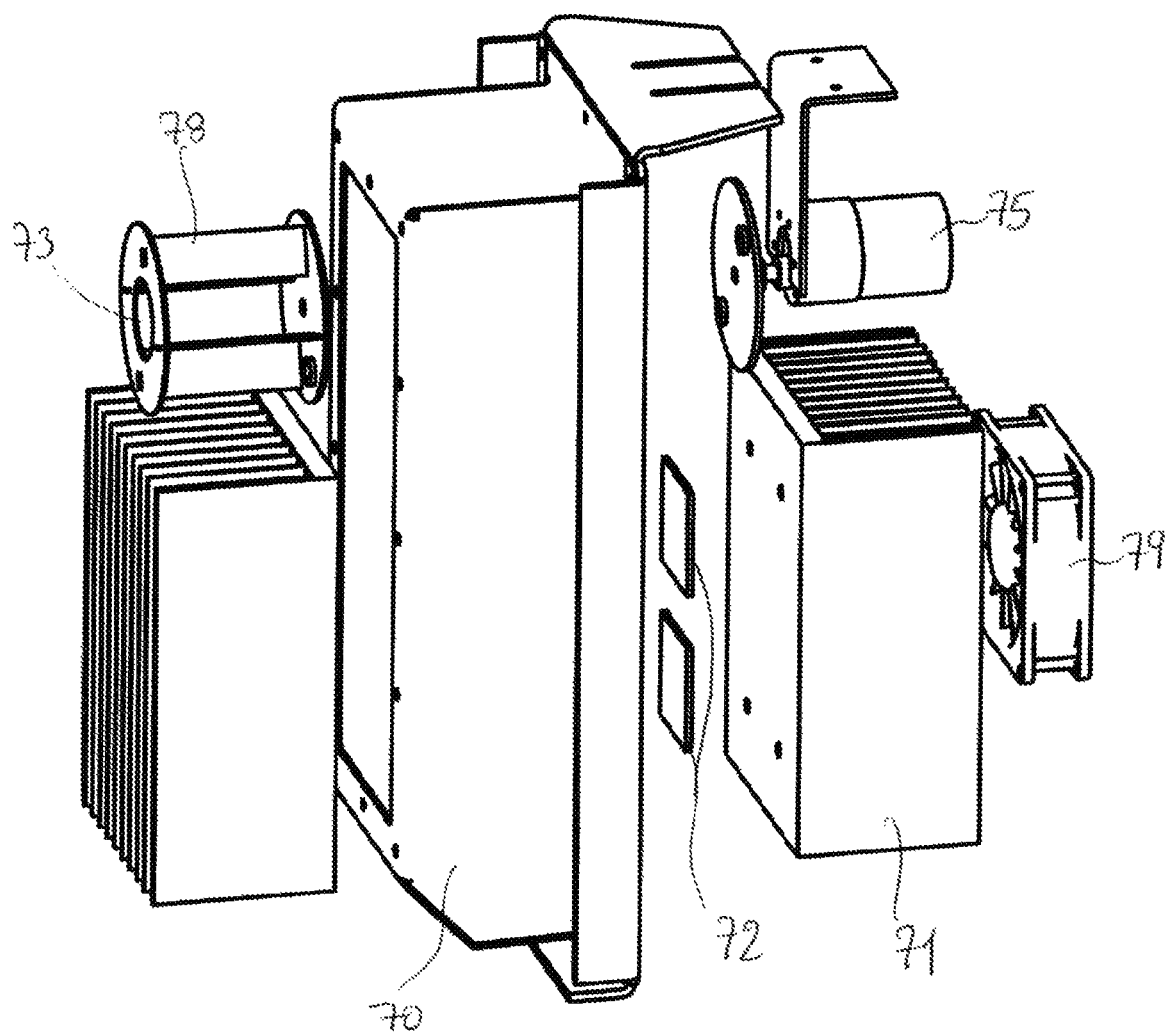
FIG. 13 is an exploded perspective view of the condenser unit of FIGS. 11 and 12.

The apparatus further comprises a recovery unit of evaporated process plasticizer by condensation, which starts working at the end of the exposure of the piece to process plasticizer vapours in tank 11. In the present embodiment of the invention the unit is neither separated from tank 11, nor is connected thereto by piping and with the vapour stream delivered by a pump, but is soldered to tank 11 through its condenser. With particular reference to FIGS. 11, 12 and 13, the unit comprises a vapour condenser 70 of the thermoelectric type and a heat exchanger 71 to remove the condensation heat. Also in this case, the thermoelectric condenser is equipped with Peltier cells 72 shown in FIG. 13. Peltier cells 72 are mounted between condenser 70 and heat exchanger 71 and more precisely on the outer side of condenser 70, whereas its inner side, opposed to the outer side, faces into tank 11. The cold side of Peltier cells 72 faces towards condenser 70, whereas the hot side faces towards heat exchanger 71. Condenser 70 is internally finned and communicates with tank 11 through at least two opening 73 and 74, formed on its inner side, for the inlet of the process plasticizer vapour rich mixture and for the outlet of the process plasticizer vapour lean mixture that is returned to tank 11. The air/vapour mixture circulation through condenser 70 in controlled by a magnetically driven fan 78 and relevant motor 75. Fan 78 is positioned within condenser 70 above its finned portion axially lined up to opening 73, and sucks the air/vapour mixture from tank 11 through opening 73 delivering it among the inner fins of the condenser cooled by Peltier cells and towards outlet opening 74. Upon contact with the fins, a part of process plasticizer vapours condense and fall by gravity on the bottom 70a of condenser box, where they stay up to the end of the working cycle. A discharge pipe 76 extending from condenser bottom is equipped with a solenoid valve 77 that is opened to discharge the condensed process plasticizer in a container (not shown).

The hot side of Peltier cells is air cooled by finned heat exchanger 71 through a inner motor-driven fan 79, shown in FIG. 13.

At the end of the condensation step, some process plasticizer in vapour phase mixed with air is still present in tank 11. To further reduce the amount of process plasticizer to a slightly detectable olfactory level, the air containing small amounts of process plasticizer vapours present in tank 11 is sucked by a pump 81 and passed through a filtering unit 39. Filtering unit 39 is equal to that already described for the embodiment of FIGS. 1 to 7 and full reference to this description is made herein.

Filtering unit 39 contains a liquid capable of absorbing or neutralizing the residual process plasticizer, for example a water filter when the process plasticizer is acetone or other water-soluble substance. Pump 81 sucks ambient air and delivers it to tank 11 through a pipe 82 equipped with a solenoid valve 83, From tank 11 the air/vapour mixture containing residual vapours comes out through a pipe 84 equipped with a solenoid valve 85 to be fed to filtering unit 39.

It is worth noting that in the present embodiment of the apparatus of the invention pump 81 works for filtering unit 39 only and not even for the condenser unit to recover the process plasticizer as pump 25 of the previously described embodiment does. This results in a system simplification on one side, and the possibility of using a standard pump on the other side, and eventually a less costly and more compact apparatus.

It is also worth noting that in the present embodiment of the invention the essential function of maintaining the hot air/vapour mixture into movement inside tank 11 is not accomplished by a dedicated fan 18 placed at the bottom of tank 11, but by fan 78 of condenser 70, which is operated, if necessary at a higher speed, even when the condenser unit is not operative while the Peltier cells are turned off or, possibly, keeping them turned on, but with inverted polarity so as to heat condenser fins to prevent the process plasticizer condensing during the treatment cycle. A further advantage of this embodiment is, therefore, the absence of the circulation fan inside tank 11 and relevant motor, without adversely affecting the apparatus performance.

Figure 14:
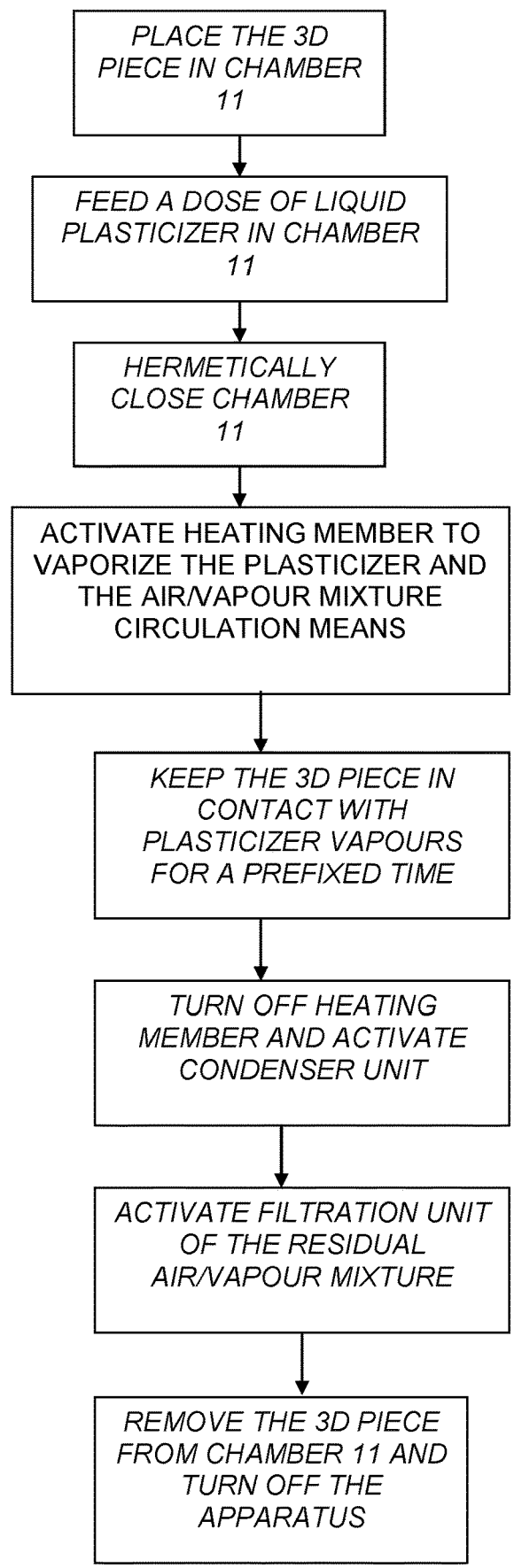
FIG. 14 is a flow diagram illustrating the method according to the invention.

In the following, the apparatus operation will be described making also reference to the process plasticizer cycle schematically shown in FIG. 8 and the flow diagram of FIG. 14.

The operating process substantially comprises four main operating steps. These steps are the following:

Evaporation of the process plasticizer: in this step (start of the cycle of treatment of the 3D piece, previously positioned in tank 11) heating member 15 increases the temperature of the process plasticizer, in a liquid phase, (also previously charged in tank 11), thus correspondingly increasing the amount of plasticizer vapours in the air/vapour mixture present in tank 11. The air/vapour mixture, continuously moved in the tank 11 by fan 18 or fan 78, contacts the piece under treatment heating it up to establish a thermal equilibrium condition with it.

Molecular absorption of the process plasticizer vapours in the 3D piece during the treatment, once the equilibrium working temperature has reached which is maintained by heat supply and keeping a high thermal uniformity in tank 11 thanks to the action of fan 18 or fan 78.

Process plasticizer recovery: once the exposure step to process plasticizer vapour has ended, the latter is circulated through the condenser unit, and is then converted into a liquid. In this step it is possible to convert into liquid a certain percent only of process plasticizer, but not the 100% thereof, due to physical and technological limitations.

Filtration: the process plasticizer still present in the vapour phase in the air/vapour mixture, is filtered, in particular within water filter 39, to remove any residues of process plasticizer therefrom.

In the apparatus according to the embodiment of the invention shown in FIGS. 1 to 7 the process plasticizer cycle is illustrated in detail in FIG. 8

The apparatus operation is discontinuous. After positioning the piece(s) to be treated in tank 11, where suitable piece supports, not shown, are provided, the process plasticizer is fed in a prefixed dose suited to the volume of tank 11. Advantageously, the prefixed dose of process plasticizer is contained in a cartridge or capsule C of metallic material (aluminium, for example) or plastic material or a material compatible with the plasticizer, provided with a cap or section intended to be pierced. Unopened capsule C is placed in housing 20 and identified by optical reader 23 which enables cover 12 to be closed hermetically. Upon closing cover 12 urges capsule C against piercing member 48 at the bottom of housing 20, whereby capsule opens and its content flows out to tank 11 through conduit 21. It is to be noted that, in order to prevent any process plasticizer vapours from escaping out of housing 20, a seal 56 is placed between cover 12 and the inlet of housing 20, or an on-off solenoid valve 61 can be provided on conduit 21, either at the outlet side of housing 20 or the inlet side of tank 11 as shown in FIG. 10.

The process plasticizer in tank 11 is heated by supplying heat through heating member 15 placed at the bottom of tank 11. Fan 18, or fan 78 in the embodiment of FIGS. 9-13, is kept in operation to promote an uniform diffusion of the process plasticizer vapours throughout the volume of tank 11 and to maintain an uniform temperature in the internal atmosphere of tank 11. Upon contacting the surface of the 3D piece to be treated, being of a temperature substantially equal to that of the air vapour mixture surrounding the piece, the process plasticizer vapours contained in the circulating air/vapour mixture are absorbed by, and penetrate into the surface of the 3D piece forming an homogeneous mixture with the polymeric material or a component thereof and thus lowering the $T_G$ of the material. Heating members 17, placed at the side walls of tank 11, keep these walls warm thus preventing any condensation of the solvent contacting them.

The result of the treatment can be followed through transparent window 41 placed on cover 12 to allow the operator to check if the obtained finishing effect is the desired one and decide whether extend the treatment time or change some working parameter or repeat the whole cycle according to the needs, before passing to the process plasticizer recovery step.

At the end of the 3D piece treatment step, namely when the 3D piece surface reaches the desired finishing degree, a mixture of air and process plasticizer vapours, as well as liquid plasticizer is present in tank 11. To avoid that, on the opening of cover 12, the operator comes into contact with plasticizer vapours or the plasticizer vapours spread in the working environment, before the opening condenser 24 is activated. With reference to the diagram of FIG. 8, two solenoid valves 42 and 43, respectively on conduit between tank 11 and condenser 24 and between condenser 24 and pump 25, are opened and pump 25 is started, thus starting the circulation of the concentrated air/vapour mixture between tank 11 and condenser 24 and the circulation to tank 11 of the diluted mixture, while the gradually condensing plasticizer is collected in container 26.

The working temperature of the condenser is about −15° C. at the cold side of each Peltier cell, said temperature being reached within about 5 minutes from the cell start up. The apparatus according to FIGS. 9 to 13 operates in a similar way, except that pump 81 only serves to feed the vapour-lean air/vapour mixture to the final water filter.

When about 70% of the plasticizer vapours are condensed, the two solenoid valves 42 and 43 are closed and two solenoid valves 44 and 45 are opened, respectively on ambient air suction side of pump 25, which is discharged in tank 11, and on conduit conveying the diluted air/vapour mixture to bubbler 39a from tank 11. Aerator 40 present at the bottom of bubbler 39a breaks the mixture flow into small bubbles raising towards the surface of water present in the bubbler. During this path the still present process plasticizer is dissolved forming a substantially odourless, very diluted (<5%) plasticizer aqueous solution. At the end of the filtration step, once pump 25 is turned off and all the valves are closed, cover 12 can be lifted and the finished 3D piece can be removed. A vent is provided for discharging air containing traces only of plasticizer.

The condensed process plasticizer, collected in container 26, is recovered by reaching container 26 through an access port 46 to draw it out and emptying it, while a second access port 47 allows the bubbler 39a to be drawn out to empty it.

The two port, shown with discontinuous line in FIG. 1, are provided on a side face of outer housing 10 of apparatus 1 and comprise inspection windows 51 and 52.

The operation of the above described apparatus is managed by a program implemented of a microprocessor housed in an electronic card 53, which controls the start and stop of the operating steps and the duration of each step, which is set at the beginning of each treatment and decided on the basis of the shape of the pieces and other criteria. In general, most of operating parameter are fixed and pre-set in the program regardless of the shape of the pieces to be treated, in a way that the user needs only choose among two or three treatment levels (which are proportional to the exposure time to plasticizer vapours). Obviously, it will be possible to access to a customization function to select the various operating parameters on the basis of special needs or working experiences gained of specially shaped 3D pieces.

The program managing the working cycle of the apparatus according to the invention receives pressure and temperature signals from suitable sensors placed in tank 11 (for example, pressure sensor 80 of FIG. 10) and accordingly control the heat flow from heating member 15, side heating members 17 with the aid (if necessary and if installed) of cooling fans 17. The program also controls the flow rate of the cooling liquid and the duration of the condensation step through temperature sensors placed in the plasticizer recovery unit.

It will be understood that, with the operating conditions of the method according to the invention, the formation of condensed process plasticizer on the surface of the piece to be treated is avoided. This is mainly due to keeping a constant thermal equilibrium between the piece surface and the air/vapour mixture circulating in tank 11. In this way, it is ensured that the plasticizer vapour only comes into contact with the piece surface and penetrates thereinto. Penetration process is relatively slow and cannot take place when a solvent condenses on the piece, such as in the process according to WO2010002643, wherein the presence of the condensed solvent on the surface of the piece, besides hindering the contact with the vapour, produces a rapid surface solubilisation, enhanced also by the fact that a fluorocarbon solvent is used, which, in the case on an ABS piece, also dissolves the poybudadiene phase of the polymer.

In the following examples there is illustrated the performance of the apparatus operating according the method of surface finishing of pieces obtained by 3D printing. Each sample in these tests was printed through Zortrax M200 3D printer using proprietary filament Z-ABS, except where otherwise indicated. The printing option used is that pre-set in Z-suite software with the "Mesh" mode at 20%, except where otherwise indicated. The treatment according to the method of the invention was conducted with optimized parameters: process plasticizer vapours exposure time: 50 minutes; working temperature: 35° C.

Example 1

The dependence between the penetration of the process plasticizer (specifically, acetone) in the polymer, strictly related to the exposure time, and the mechanical and aesthetical properties was investigated. Samples (4 bulky parallelepipeds made in ABS Zortrax, size 80×10×4 mm) printed at maximum infil with Zortrax M200 were treated for different times (30, 60 and 90 minutes). After treatment in the apparatus operating according to the method of the invention, SEM images of the part made visible after sample cryogenic fracture were captured. In this way, acetone penetration up to a length equal to 1.5 mm (90 minutes test) was observed. Basically, as time passes, acetone penetrates ever more deeply thus forming a concentration gradient (meant as an amount of acetone in the polymer) ever greater over the penetration axis.

Test results are shown in the following Table 1.

TABLE 1

| Minutes | Penetration (mm) |
|---------|------------------|
| 30 | negligible |
| 60 | 1.1 |
| 90 | 1.5 |

Figure 15:
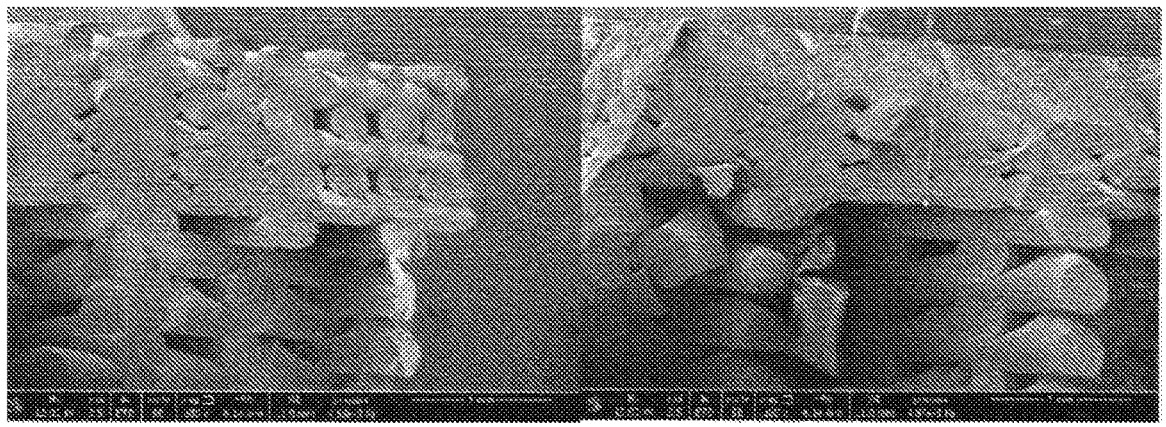
FIG. 15 shows two SEM images of a section of a 3D printed ABS sample fractured by means of liquid nitrogen, before and after the treatment according to the method of the invention.
Figure 16:
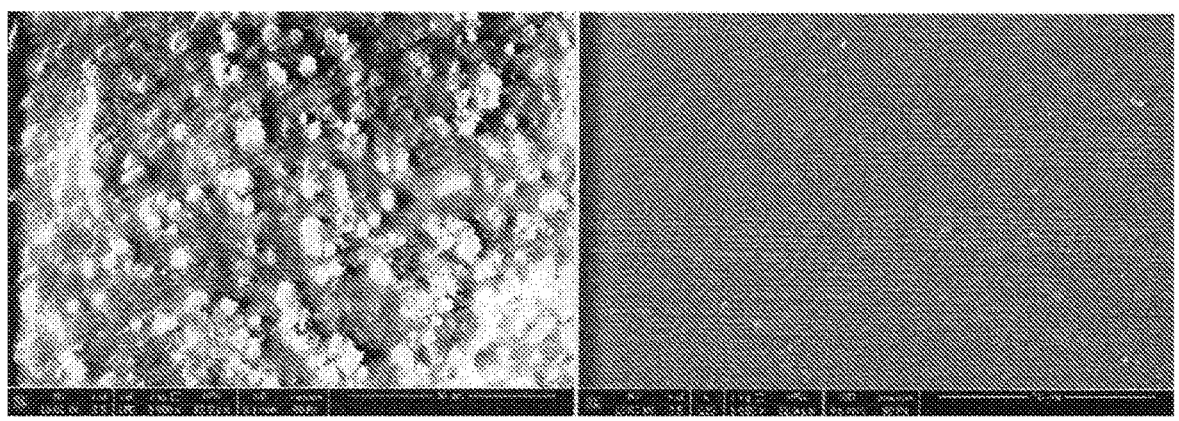
FIG. 16 shows two SEM images in front view of a face of the same sample, before and after the treatment according to the method of the invention.

The SEM captured images of the samples show that roughness is remarkably reduced after treatment of ABS samples. See FIG. 15 (magnification 100×) and FIG. 16 (magnification 5000×) showing a section of the fracture obtained by liquid nitrogen and, respectively, a front view of a portion of surface of the parallelepiped before and after the treatment. The roughness clearly appears in the left side images and negligible in the right side ones.

Example 2

In order to test the mechanical performance of samples treated in the apparatus operating according to the method of the invention IZOD tests were conducted taking simply printed samples as standard. The results obtained are shown in Table 2. Zortrax and Makerbot are the two filaments used in this test. All the samples were printed with Zortrax M200.

TABLE 2

| Filament | Untreated (kJ/m$^2$) | Treated (kJ/m$^2$) | Improvement (%) |
|----------|---------------------|--------------------|-----------------|
| Zortrax at 45° | 7 ± 0.6 | 11.7 ± 1.1 | +57 |
| Zortrax at 0° | 9.8 ± 0.3 | 16.2 ± 0.1 | +65 |
| Makerbot at 45° | 9.6 ± 0.8 | 12.2 ± 1.4 | +27 |
| Makerbot at 0° | 14.4 ± 1.3 | 15.8 ± 1.1 | +2.5 |
| Zortrax vertical | 1.3 | 4.3 ± 0.5 | +230 |
| Makerbot vertical | 5.0 ± 0.5 | 16.8 ± 0.4 | +236 |

It is important noting that printing orientation affects the impact strength, and more generally the mechanical properties of the printed workpieces. It was discovered through NMR analysis that the Makerbot ABS has a higher butadiene content (50% styrene phase in Zortrax and 35% only of styrene phase in Makerbot) and this explains why the treatment has a less significant impact on the improvement of mechanical properties of the Makerbot workpiece. As a matter of fact, the plasticizer used with the treatment according to the invention interacts with the styrene phase of ABS, whereas it is inert with respect to the butadiene phase.

IZOD test was also conducted on samples treated with the same times used for studying the penetration of the above cited plasticizer. The results obtained by conducting three tests for each samples are shown in the following Table 3.

TABLE 3

| untreated | 30 minutes | 50 minutes | 90 minutes |
|-----------|------------|------------|------------|
| 11.8 ± 1.2 kJ/m$^2$ | 16.1 ± 0.3 kJ/m$^2$ | 17.5 ± 0.8 kJ/m$^2$ | 20.1 ± 2.0 kJ/m$^2$ |

From the above description It appears clearly that the apparatus and the method according to the invention fully achieve the prefixed objects.

In general, the described apparatus has the advantage, with respect to other apparatuses performing surface finishing treatments, of neither adding nor subtracting material to the pieces that are treated. The surface finishing according to the process of the invention is, in all respects, a rearrangement of a surface layer of the treated pieces. The unevenness is eliminated and the surface is made more homogeneous. With respect to techniques such as sanding, tumble finishing, and the like, there is no material removal. With respect to painting and the like, there is no addition of material.

With respect to apparatuses performing surface chemical finishing, thanks to the substantial absence of condensate formation during the treatment of the 3D piece, a more accurate control of the finishing process is obtained, without loss of plastic material due to runoff and/or condensate buil-up, and moreover an increase of the surface mechanical resistance of the 3D piece can be obtained thanks to the possibility of controlling the penetration depth of the process plasticizer vapours.

With respect to the apparatuses for surface finishing of 3D pieces according to known art, the apparatus of the invention has the advantage of being featured by a relatively low size and weight and of being automated and safe in use even in not industrial contexts. An important advantage, from the user point of view, is the easiness of use and the almost complete absence of contact with the process plasticizer, both in the liquid form in the treatment preparation step, and in the vapour form during and after the treatment.

The apparatus compactness also results from the use of a thermoelectric condenser. With respect to condensers such as those used in a distillation process, this solution has the advantage to have a cooling type provided by a thermoelectric element and not by a liquid in contact with the surface where the condensation takes place. This allow for a more compact design, also because there is no need to cool the liquid at the condensation temperature. With respect to thermoelectric condensers such as those used in dehumidifiers, the condenser used herein has the feature of being completely insulated from the outside, being airtight to the purpose of not spreading the vapour n the environment during the condensation process.

Another advantage of the condenser used in the apparatus of the invention consists in the material used that, being metallic and both thermally and electrically conductive, allows to quickly cooling the Peltier cells and at the same time prevent build up of electrostatic charges that might ignite flammable vapours.

It is worth noting, finally, that even though the present description makes reference to pieces made of plastic material obtained through 3D printing, it is intended that the base concepts of the invention can be applied also to object, articles and products made through different technologies, but having the same problems and capable of being treated with a compatible process plasticizer (in the meaning used herein) to obtain a better surface finishing and an increase of the surface mechanical resistance.

It will be appreciated that, although reference has been made to a preferred process plasticizer feeding system using pre-packaged doses in the form of pierceable capsules, the feeding of controlled doses of process plasticizer can be made, in a conventional way, through a metering pump and relevant plasticizer tank.

These and other variations and/or modifications can be made to the method and the apparatus for surface finishing of pieces made of plastic material obtained through 3D printing without departing from the scope of the invention as set forth in the appended claims.

The invention claimed is:

1. An apparatus for surface finishing of pieces made of plastic material obtained by 3D printing, the apparatus comprising:
   an hermetically sealable chamber for containing at least one piece in need of treatment;
   a feeder for feeding a controlled amount of a process plasticizer to a bottom portion of said chamber, said feeder comprising a housing for a packaged dose of said process plasticizer, and a conduit connected to said chamber;
   a heater placed at least at said bottom portion of said chamber for heating said process plasticizer, thus forming, when said chamber is hermetically closed, a mixture of air and vapours of said process plasticizer, and for raising a temperature of said air/vapours mixture to a working temperature lower than a boiling temperature of said process plasticizer;
   a circulator positioned within said chamber for keeping a uniform circulation of said air/vapours mixture in said chamber during the heating step and during the step of maintaining at said working temperature for a prefixed time sufficient to allow a direct contact of said process plasticizer vapours with a surface of said piece and absorption of said vapours up to a desired depth under the surface of the piece; and
   a separator for separating said process plasticizer vapours from said air/vapours mixture capable of being placed into communication with said chamber once said prefixed exposure time has lapsed;
   wherein said packaged dose is a pierceable capsule, a blade for piercing said capsule being provided at a bottom part of said housing in the feeder, to allow content thereof to flow out into said chamber through said conduit.

2. The apparatus according to claim 1, wherein an optical detector is provided for detecting a prefixed identifying mark on said capsule in order to enable the capsule piercing.

* * * * *